Inventor
SOUTHWICK W. BRIGGS
By Semmes, Keegin, Beale & Semmes
Attorneys

May 28, 1946.　　　S. W. BRIGGS　　　2,401,222
PROCESS FOR CLARIFYING FLUIDS
Filed April 3, 1943　　　2 Sheets-Sheet 2
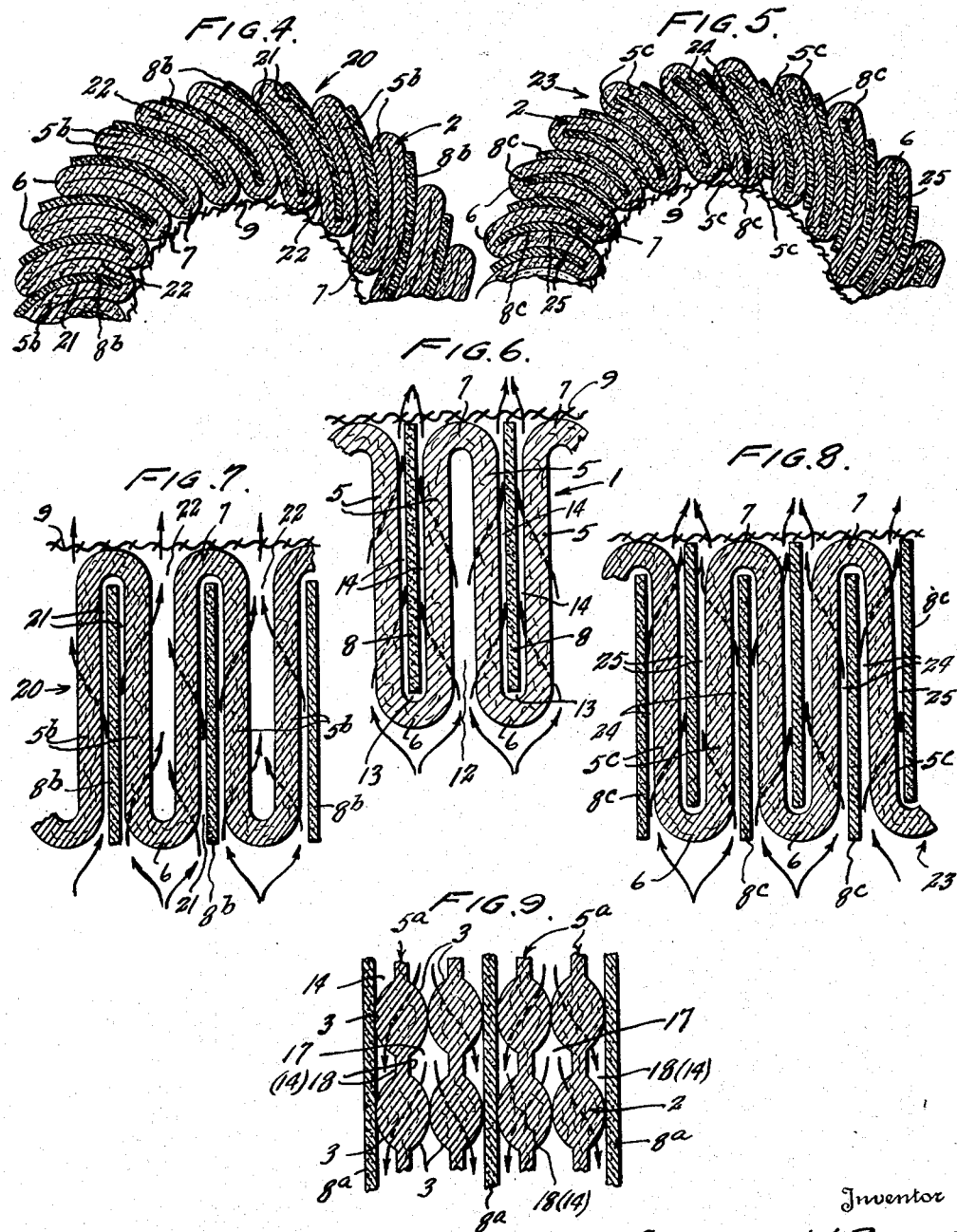
Inventor
SOUTHWICK W. BRIGGS Patented May 28, 1946

2,401,222

UNITED STATES PATENT OFFICE 2,401,222

PROCESS FOR CLARIFYING FLUIDS

Southwick W. Briggs, Washington, D. C.

Application April 3, 1943, Serial No. 481,752

12 Claims. (Cl. 210—62)

The present invention relates to filtration and more particularly to a method of removing solids and other deleterious matter from fluids.

More specifically the invention comprises passing contaminated liquids such as fuel or lubricating oils over and through a cellulosic filter material and also over the surface of a sheet of a fibrous material which is bonded together with an adsorbent, thereby to effectively separate the deleterious products from the oil.

Oils, especially those used to lubricate internal combustion engines, become contaminated with dirt and metal particles, carbon, and acids, which, for continued use of the oil, must be removed to prevent damage to the engine. Fuel oils likewise may contain contaminants which, if not removed, would prove detrimental to such apparatus as the fuel injection pumps of a Diesel engine.

Different types of liquids having varying degrees and types of contamination require clarification under different conditions. I have found, however, that by first dividing the body of the contaminated fluid into a number of distinct and separated smaller bodies or streams and subjecting these small streams in sequential steps to the action of a cellulosic filtering material and an adsorbent, effective separation of the contaminants can be rapidly accomplished. It is within the concept of this invention to perform these sequential steps in an order best suited to the type of liquid being treated. For instance, after dividing the main body or stream of contaminated liquid into smaller bodies or streams, these streams may either be subjected first to a filtration step which is followed by an adsorbing treatment; or the separate streams may first be subjected to the action of an adsorbent and then filtered to remove solids. Or, alternately the contaminated streams may be first subjected to an adsorbing step, then filtered and then subjected to a second adsorbing step.

In carrying out my process I prefer to pass the contaminated liquid through a substantially thick filter wall fabricated by folding accordion fashion a sheet of cellulose filtering material which has its opposite surfaces corrugated in juxtaposed alternate ribs and grooves extending lengthwise of the sheet. Between at least a portion of the accordion folds are interposed sheets or strips of a bonded adsorbent material. The ribs on adjacent surfaces of the filtering material are brought into engagement with each other or with the adsorbent sheet, as the case may be, to form sets of passages opening alternately on opposite sides of the filter wall, to provide inlet and discharge channels for the liquid. The liquid to be clarified flows through the filter wall by longitudinally entering the inlet channels, dividing itself into small distinct streams thereby, flowing through the webs or stretches of cellulose filtering material separating the inlet from the discharge channels, and then flowing longitudinally through and out of the discharge channels. While following this path not only are solids separated from the liquid as it passes through the cellulose material, but non-filterable contaminants, such as acids, are also removed as the liquid flows in contact with the adsorbent material.

I have also found it advantageous and practical to clarify contaminated oils by passing them radially inwardly through a filtering wall constructed and arranged as above set forth and which has been formed into a tubular configuration. Such a unit makes an efficient and readily replaceable filter cartridge adaptable for use in many types of oil clarifying apparatus.

In the drawings which are employed to illustrate several arrangements of the parts comprising a filtering device by means of which my process may be carried out, Figure 1 is a horizontal cross-sectional view of a filtering element for use primarily in separating detrimental contaminants from fuel oil.

Figure 4 is a fragmental view similar to Figure 3 illustrating a modified arrangement of parts.

Figure 5 is a view similar to Figure 4 showing a still further modification of the disposition of the parts.

Figure 6 is a diagrammatic illustration showing radial flow of fluid through a filter element arranged as illustrated in Figure 1.

Figure 7 is a view similar to Figure 6 but illustrating radial flow of oil through an element arranged as in Figure 4.

Figure 8 is a view similar to Figure 6 showing radial flow through an element such as depicted in Figure 5.

Figure 9 is a diagrammatic view perpendicular to the radial flow channels illustrating the flow of oil while passing through the filter wall of a unit such as shown in Figure 3.

Figure 1:
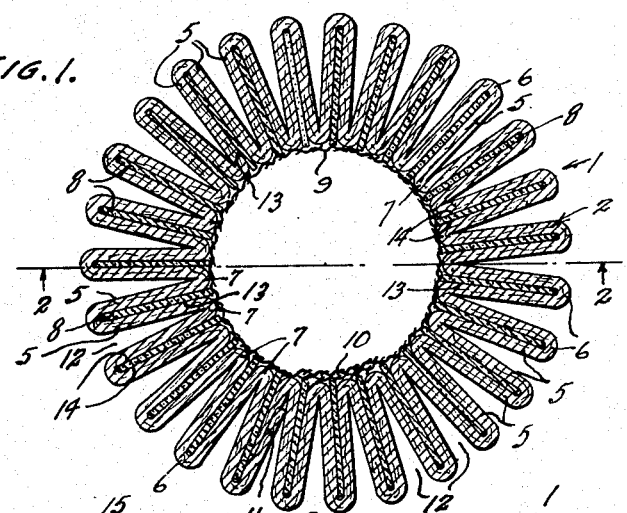
Figure 2:
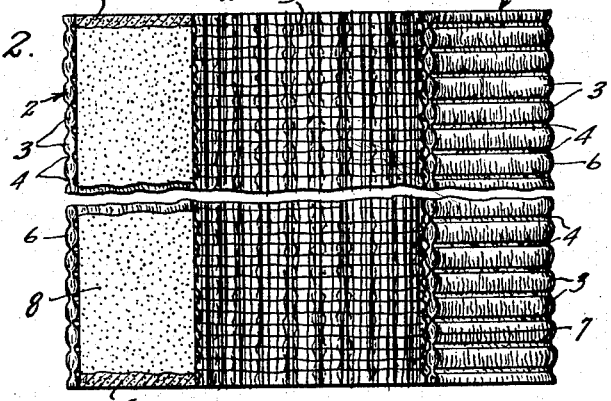
Figure 2 is a transverse sectional view taken along the line 2—2 of Figure 1 looking in the direction of the arrows.

Referring more particularly to the drawings, Figures 1 and 2 illustrate respectively a horizontal cross section and transverse sectional view of a filtering element having a tubular wall 1. The tubular wall 1 is formed of a sheet of cellulosic material 2 of the type known as embossed cellulose wadding. This wadding is fabricated by superimposing a plurality of plies of thin gauze-like webs of loosely interlaced cellulose fibers and then passing the multi-ply sheet between corrugated pressure rolls which emboss both surfaces with juxtaposed alternate parallel ribs 3 and valleys 4 such as shown in Figure 2 and also in the enlarged view, Figure 9.

It is to be noted that the portion of the cellulosic material defined by the ribs 3 is rather loosely packed and while the material will freely pass the fluid, the fibrous structure is sufficiently dense and interlaced to effectively separate solids from the fluid in its passage therethrough. The portion forming the valleys, on the other hand, is tightly compressed and relatively impervious to the passage of fluid. This structure of the cellulose wadding serves an important function in my process of fluid clarification as will be seen.

To form the tubular wall 1 of the filtering element, a sheet of the cellulose wadding 2 of the proper length and width, with the ribs 3 extending lengthwise of the sheet, is first folded upon itself accordion fashion providing thereby a series of adjacent webs 5 connected by alternately reversed folds 6 and 7. Interposed between alternate adjacent webs 5 is a strip of bonded adsorbent material 8. These strips 8 are rectangular and preferably have a length coextensive with the length of the webs 5 and a width such that one of their longitudinal edges lies adjacent the inner surface of the folds 6 and their opposite longitudinal edges in a plane tangent to the outer surface of the folds 7.

The type of material I prefer to use for the adsorbent strips 8 is similar to that used in my co-pending application Serial No. 237,554. As described in that application, the adsorbent material is combined with a flexible base or bonding material such as cellulosic fiber. This adsorbent material can be in very fine form distributed evenly through the fiber mass. In manufacturing the sheets of adsorbent containing material, cellulosic fiber and the selected adsorbent material such as relatively finely divided bauxite are beaten together to a pulp in the presence of liquid. The pulp is compressed into paper-like sheets, similar to those of pure cellulosic paper, and which form an excellent adsorbent material. The bauxite or other adsorbent used may be under 60-mesh in fineness and it has been found that the adsorbent containing sheets are particularly effective when the bauxite is contained in a proportion under 25% by weight of the finished product. If the material is used in thicker sheets, the percentage by weight of bauxite may be increased to as high as 75% of the total weight of the adsorbent material. In ordinary small filters, however, a composition containing approximately 50% by weight of bauxite is found to be effective. The bauxite and cellulose bonding material are compressed into a compact sheet which is relatively impervious to the passage of liquid.

After inserting the adsorbent strips 8 between the webs 5, as above set forth, the accordion folded assembly may be slightly compressed in a direction normal to the folds and a strip of open mesh fabric 9 such as cheesecloth is cemented to the surface defined by the folds 7. The fabric strip 9 is of a length sufficient to extend somewhat over one end of the compressed assembly to provide a tab 10.

The above assembly is next bent into a tubular formation, as shown in Figure 1, with the folds 7, having the fabric strip attached thereto, defining the inner periphery of the tubular filtering element. In bending the material into its tubular formation alternate adjacent webs are fanned out as shown in Figure 1, with the folds 6 defining the outer periphery of the filter. Opposite ends of the cellulose sheet are cemented together as illustrated at 11 and the tab 10 is cemented to the opposite end of the fabric strip 9. This provides a self-sustaining tubular filter wall having a series of alternate radial passages or spaces 12 defined by adjacent outer ribbed surfaces of the webs of cellulose wadding. Juxtaposed with respect to the passages 12 are alternate radial passages 13 formed by adjacent ribbed inner surfaces of the webs. The passages 12 are closed at their inner ends by the folds 7 while the passages 13, containing the adsorbent 8, are closed at their outer ends by the folds 6. It is to be noted that the ribs of the corrugated inner surfaces of adjacent webs of the cellulose wadding engage opposite surfaces of the adsorbent strips 8 to form, in effect, series of juxtaposed channels 14 (see Figure 9) extending radially with respect to the tubular element 1, on both sides of the strips 8. A portion of the walls of these channels is formed by the web 5 of cellulosic filtering material and a portion by the bonded adsorbent material 8.

As to be more fully described, the oil to be clarified flows generally radially with respect to the tubular wall 1, the spaces 12 and 13, between the webs 5, serving respectively as inlet and discharge passages for the oil. To prevent short circuiting of the oil between the passages 12 and 13 and to assure its passage through the webs of the folded cellulose wadding, the upper and lower ends of the discharge passages 13 are closed by suitable means such as by sealing with an impervious sealing compound 15.

Fuel oil, while containing some solid contaminants, such solids are usually of relatively large size and the structure just described provides an open filter surface which is particularly desirable in the rapid filtration of such oils. This element does, however, provide for intimate contact of the oil with the adsorbent to effectively remove acid impurities.

Figure 3:
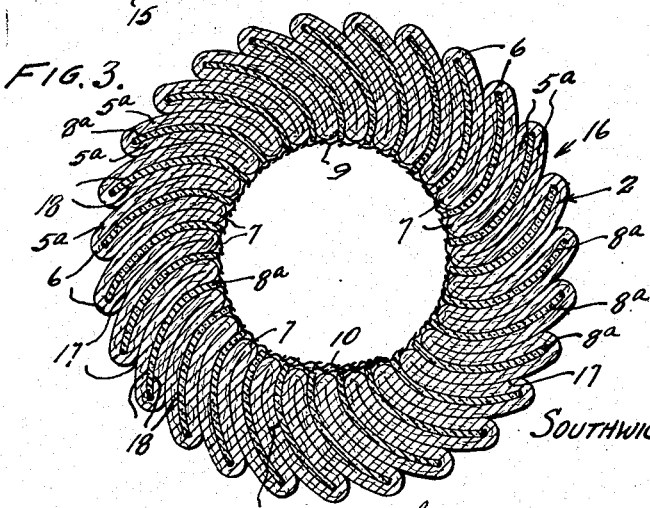
Figure 3 is a view similar to Figure 1 illustrating a modification of the element shown in Figure 1 which is used primarily for removing contaminants from lubricating oil.

In purifying lubricating oils, on the other hand, particularly oils being used as lubricants in internal combustion engines, a more compact filter element is desirable. Such an element is shown in Figure 3 and has a tubular wall which is designated generally by the numeral 16. The construction and assembly of this unit is substantially similar to that described in connection with Figures 1 and 2. In this case, however, the sheet of cellulosic wadding is folded to form webs 5a somewhat greater in width than webs 5 constituting the wall 1. After the assembly has been formed into its tubular configuration its inner and outer peripheries are rotated slightly in counter-directions. This causes the webs 5a to be curved, substantially as shown in Figure 3, and the adjacent outer surfaces of the webs to be brought into engagement with each other. The unit may be maintained in this condition by any suitable restricting means such as by loops of strings or wire or by inserting the unit into a foraminous sleeve of mesh or perforated sheet material (not shown).

Bringing the adjacent ribbed surfaces of the webs together provides, in place of the open inlet channels 12, series of juxtaposed parallel input channels 17 (see Figure 9) which are formed by abutting parallel ribs 3 of the contacting ribbed surfaces. These channels open on the outer periphery of the tubular filter wall and have their inner ends substantially closed by the folds 7 of the cellulose wadding. Juxtaposed with respect to the input channels 17 are discharge channels 18 which are separated from the channels 17 by the cellulose fiber webs 5a. The channels 18, like the channels 14, are formed by the inner ribbed surfaces of adjacent webs of the cellulose wadding engaging opposite sides of the bonded bauxite strips 8a. The walls of each of these channels 18 are likewise composed, in part, of the adsorbent material 8a and in part, of the cellulosic material which separates the channel 18 from its adjacent channel 17.

Either of the two elements just described is adaptable as a replaceable filtering element or cartridge in an oil clarifying device of a type consisting essentially of an enclosed casing in which one (or a plurality) of such elements is positioned in a manner whereby its central duct is sealed off from the interior of the case. The contaminated liquid is admitted to the interior of the case, flows through the tubular wall of the filtering element and into the central duct from which the clarified oil is withdrawn for use.

In describing the clarification of the oil as it flows through the wall 1 of the filter element, reference is made to Figures 6 and 9 which diagrammatically represent respectively a cross section of a fragment of the filter wall parallel to the flow passages and a longitudinal section of a fragment of the wall perpendicular to the flow passages. As indicated by the arrows in Figures 6 and 9, the contaminated oil, under pressure, flowing into the inlet passages 12, will penetrate into the pores of the cellulosic material, flow primarily through the relatively loose fibrous structure of the ribbed portions 3 of the cellulosic webs 5 and into the discharge channels 14. As the oil flows through the webs it is subjected to the filtering action of the interlaced cellulosic fibers and solid particles will be separated from the liquid. As the liquid enters the channels 14 and flows therethrough, it comes in contact with the strips 8 and is subjected to the action of the adsorbent to remove the detrimental acid contaminants from the oil. It is to be noted that the body of liquid when it enters the discharge passage is divided into a number of small well defined and separate streams thereby assuring that substantially the entire body of a liquid will come in contact with the adsorbent material.

It is to be noted also that the liquid flows through adjacent webs 5 into discharge channels from opposite directions. This is an important feature in that not only the entire area of both surfaces of strips 8 are utilized in the adsorbing step but also the forces exerted by pressure of the liquid on the webs of the filter wall are equalized thereby preventing its distortion and collapse.

The flow of liquid through the filter element illustrated in Figure 3 of the drawings is substantially as just described. In this case, however, the adjacent ribbed surfaces of the inlet passages 13 are in contact thus dividing the inlet passages into a series of small separated flow channels 17. By means of these channels the body of liquid is broken up into a number of distinct streams as it enters the filter wall. This is advantageous in clarifying lubricating oils containing a high percentage of solids as a portion of the larger and heavier particles will be separated from the oil before it actually enters the filter wall. Then, too, initially dividing the body of oil into a number of distinct streams or bodies, evenly distributed over the entire filtering unit, effectively prevents the solids separated on the surface of the webs from settling and clogging the filter material in the region adjacent the lower part of the filter unit.

It may be desirable under certain conditions to subject the contaminated oil to the adsorption step prior to filtration. Such a process can be effectively performed by means of an arrangement such as illustrated in Figure 4. In this arrangement, the tubular filter wall is designated by the numeral 20 and is constructed substantially like that in Figure 3 with the exception that in this case bonded adsorbent strips 8b are interposed between the walls of the inlet passages, that is, those opening on the outer periphery of the tubular wall. The webs 5b of the ribbed cellulose wadding in the wall 20 are also curved so that the ribs 3 contact with the strips 8b dividing the inlet passages into series of parallel inlet channels 21 each having one of its side walls composed of adsorbent material and the opposite walls formed by the cellulosic material. Curving the webs 5b into frictional engagement with the adsorbent strips 8b serves to maintain these strips in place. The ribs of adjacent walls of the outlet passages are likewise in engagement thereby dividing the outlet passages into series of parallel discharge channels 22.

The flow of oil through this last-described type of filter wall is graphically indicated by the direction arrows in Figure 7. Here, it will be seen that the body of oil divides as it enters the channels 21, flows inwardly of these channels in contact with the strips of adsorbent material 8b, through the webs 5b of cellulose filtering material and into the discharge channels 22, and thence out through their open ends.

Figure 5 illustrates an arrangement of the filtering and adsorbing elements of the clarifying unit which is particularly adaptable in purifying oils having a high degree of acid contamination. In this figure, the webs 5c comprising a filter wall 23, are curved in a manner similar to those shown in Figures 3 and 4. In this unit, however, adsorbent strips 8c are positioned in both the inlet and outlet passages dividing these passages respectively into series of distinct parallel inlet channels 24 and outlet channels 25 all of which have both an adsorbing wall composed of the strip 8c and a filter composed of the cellulose wadding webs 5c.

The flow of oil through the filtering wall 23 is illustrated in Figure 8 by arrows which show that the oil is first subjected to adsorption by flowing in contact with the material 8c in the inlet channels 24; then to filtration by flowing over and through the cellulose webs 5c thereby effecting a separation of its suspended solids; and thence to a second adsorption step as it flows through the discharge channels 25.

The cellulose wadding employed in all of the arrangements above described offers a certain resistance to the passage of liquid through the webs of cellulose wadding and thereby assures that the oil entering the filter wall flows through the entire depth of the flow channels, thus utilizing to the fullest extent the surface area of the filtering material. As a consequence of the above, the entire effective surface areas of the adsorbent strips are also utilized in removing acid contamination from the oil.

The flow of liquid through the unit during the clarification process follows a distinct and continuous path in which the desired sequence of steps of the process is carried out. This sequence may vary to satisfy various conditions, as heretofore brought out, by employing different arrangements of the filtering and adsorbing elements. In each case, however, the steps in the process, whether they be filtration followed by adsorption, filtration preceded by adsorption, or an adsorption step followed by a filtration step which in turn is followed by a second adsorption step, will be performed in sequential order.

While I have shown and described a filter element having a tubular wall as a medium for carrying out my process, I wish it to be understood that I need not be so restricted as obviously the same steps of the process could be performed and the same results could be obtained by the flow of contaminated liquid through filtering walls having similar arrangement of parts as the tubular devices described but having different configurations. Also while particularly adaptable to the clarification of oils such as fuel or lubricating oils, the process may be likewise employed in purifying other contaminated liquids and gases. Therefore my invention is to be limited only by the scope of the appended claims.

I claim:

1. A method of separating solids and other deleterious matter from fluids comprising successively passing the contaminated fluid in relatively small and well defined streams through a cellulosic filtering material and in an unobstructed flow over and in contact with but not through an adsorbent material.

2. A method of separating solids and other deleterious matter from fluids comprising the steps of successively passing the contaminated fluid in relatively small and well defined streams, first through a cellulosic filtering material, and subsequently in an unobstructed flow over and in contact with but not through an adsorbent material.

3. A method of separating solids and other deleterious matter from fluids comprising the steps of successively passing the contaminated fluid in relatively small and well defined streams, first in an unobstructed flow over and in contact with but not through an adsorbent material, and subsequently through a cellulosic filtering material.

4. A method of separating solids and other deleterious matter from fluids comprising the steps of successively passing the contaminated fluid in relatively small and well defined streams, first over and in contact with but not through an adsorbent material, then through a cellulosic filtering material, and finally over an adsorbent material, the fluid being passed over the adsorbent material in an unobstructed flow.

5. A method of separating solids and other contaminants from fluids, comprising passing the fluid through a filter wall composed of an accordion folded sheet of cellulosic material, the fluid being introduced into spaces between adjacent webs of said folded sheet opening on one face of said wall, then passed through said webs into spaces between the webs but opening on the opposite face of the wall, then discharging the fluid from the last named spaces while passing the fluid over and in contact with but not through an adsorbent material interposed between adjacent webs in at least one of said groups of spaces.

6. A method of separating solids and other contaminants from fluids, comprising passing the fluid through a filter wall composed of an accordion folded sheet of cellulosic material, the fluid being introduced into spaces between adjacent webs of said folded sheet opening on one face of said wall, then passed through said webs into spaces between the webs but opening on the opposite face of the wall, then discharging the fluid from the last named spaces while passing the fluid over and in contact with but not through an adsorbent material interposed between adjacent webs in the first named group of spaces.

7. A method of separating solids and other contaminants from fluids, comprising passing the fluid through a filter wall composed of an accordion folded sheet of cellulosic material, the fluid being introduced into spaces between adjacent webs of said folded sheet opening on one face of said wall, then passed through said webs into spaces between the webs but opening on the opposite face of the wall, then discharging the fluid from the last named spaces while passing the fluid over and in contact with but not through an adsorbent material interposed between adjacent webs in the last named groups of spaces.

8. A method of separating solids and other contaminants from fluids, comprising passing the fluid through a filter wall composed of an accordion folded sheet of cellulosic material, the fluid being introduced into spaces between adjacent webs of said folded sheet opening on one face of said wall, then passed through said webs into spaces between the webs but opening on the opposite face of the wall, then discharging the fluid from the last named spaces while passing the fluid over and in contact with but not through an adsorbent material interposed between adjacent webs in the said spaces.

9. A method of separating solids and other deleterious matter from fluids comprising passing the contaminated fluid successively through adjacent rows of well defined juxtaposed and substantially restricted channels, one row of said channels being separated from the adjacent row by a filtering wall composed of interlaced cellulosic fibers, the fluid being passed longitudinally into one row of channels, through said filtering wall and then longitudinally out of the adjacent row of channels, and passing the fluid in contact with an adsorbent material in unobstructed flow as it passes through at least one of said rows of channels.

10. A method of separating solids and other deleterious matter from fluids comprising passing the contaminated fluid successively through adjacent rows of well defined juxtaposed and substantially restricted channels, one row of said channels being separated from the adjacent row by a filtering wall composed of interlaced cellulosic fibers, the fluid being passed longitudinally into one row of channels, through said filtering wall and then longitudinally out of the adjacent row of channels, and passing the fluid in contact with an adsorbent material in unobstructed flow as it passes through said rows of channels.

11. A method of separating solids and other deleterious matter from fluids comprising passing the contaminated fluid successively through adjacent rows of well defined juxtaposed channels, one row of said channels being separated from the adjacent row by a filtering wall composed of interlaced cellulosic fibers, the fluid being passed longitudinally into one row of channels, through said filtering wall and then longitudinally out of the adjacent row of channels, and passing the fluid in contact with an absorbent material in unobstructed flow as it passes through the row of channels prior to its passage through said filtering wall.

12. A method of separating solids and other deleterious matter from fluids comprising passing the contaminated fluid successively through adjacent rows of well defined juxtaposed and substantially restricted channels, one row of said channels being separated from the adjacent row by a filtering wall composed of interlaced cellulosic fibers, the fluid being passed longitudinally into one row of channels, through said filtering wall and then longitudinally out of the adjacent row of channels, and passing the fluid in contact with an adsorbent material in unobstructed flow as it passes through the row of channels subsequent to its passage through said filtering wall.

SOUTHWICK W. BRIGGS.